April 21, 1936.  J. DE LA CIERVA  2,037,766

AIRCRAFT HAVING AUTOROTATIVE SUSTAINING MEANS

Original Filed Sept. 1, 1932  6 Sheets-Sheet 3

INVENTOR
Juan de la Cierva.
BY
ATTORNEYS

April 21, 1936.　　　J. DE LA CIERVA　　　2,037,766
AIRCRAFT HAVING AUTOROTATIVE SUSTAINING MEANS
Original Filed Sept. 1, 1932　6 Sheets-Sheet 4

Fig. 6

INVENTOR
Juan de la Cierva.
BY
ATTORNEYS

April 21, 1936. J. DE LA CIERVA 2,037,766
AIRCRAFT HAVING AUTOROTATIVE SUSTAINING MEANS
Original Filed Sept. 1, 1932   6 Sheets-Sheet 5

INVENTOR
Juan de la Cierva.
BY
ATTORNEYS

April 21, 1936.  J. DE LA CIERVA  2,037,766
AIRCRAFT HAVING AUTOROTATIVE SUSTAINING MEANS
Original Filed Sept. 1, 1932   6 Sheets-Sheet 6

INVENTOR
Juan de la Cierva.
BY
ATTORNEYS

Patented Apr. 21, 1936

2,037,766

UNITED STATES PATENT OFFICE

2,037,766

AIRCRAFT HAVING AUTOROTATIVE SUSTAINING MEANS

Juan de la Cierva, Madrid, Spain, assignor to Autogiro Company of America, Philadelphia, Pa., a corporation of Delaware Application September 1, 1932, Serial No. 631,355 Renewed September 4, 1935. In Great Britain September 9, 1931

13 Claims. (Cl. 244—19)

The present invention relates to aircraft of the type having a sustaining rotor normally rotated by the relative flight wind and comprising a central rotative hub turning about a substantially vertical axis and a plurality of wings or blades oscillatively or swingingly supported or mounted thereon, preferably independently, as by means of flexible or articulated attachments.

The invention refers more particularly to improvements in the rotor hub or axis mechanism and the mounting structure therefor, and to improved braking mechanism for the rotor and means for transmitting a torque to the rotor from the propulsive engine of the craft primarily for the purpose of imparting initial rotation to the rotor before flight, but also, if desired, to supplement the turning action of the relative wind in flight. The obtaining of initial rotation, preferably up to 100 R. P. M. or higher, prior to take-off, is of importance, since autorotational action of the rotor, under the influence of relative air flow in flight, normally only takes place after a certain predetermined rotational speed has been attained.

A prior form of rotor-starting mechanism is described in the co-pending patent application of Joseph S. Pecker, Serial No. 512,383 filed January 30th, 1931, which issued on April 30, 1935 as Patent No. 1,999,636. This mechanism embodies a toothed ring, crown wheel, or ring gear, mounted on the rotor hub and meshing with a pinion driven by shafting from the engine.

In constructions hitherto adopted for the rotor hub assembly the hub has been made hollow and mounted to rotate about a fixed axle or shaft supported by a pylon structure by means of a suitable apex member or members, and in the invention of the said co-pending patent application the crown wheel or ring gear is located above the apex fitting.

An object of the present invention is the provision of an improved arrangement and construction of the rotor hub together with its mounting in or on the aircraft, and of the associated elements of an engine-driven mechanical starting or assisting device, which arrangement, while capable of being advantageously employed in aircraft having an open pylon structure of the type hitherto usually employed, is particularly useful in an aircraft wherein the means of supporting the rotor are entirely enclosed within, or form part of, the body of the aircraft, in the manner described in my co-pending patent application Serial No. 617,500, filed June 16th, 1932, issued March 10, 1936 as Patent No. 2,033,571.

According to the present invention the central hub of the rotor comprises a part to which the blades are attached and an axle or spindle secured thereto or solid therewith, said axle being rotatively mounted by means of external bearings in a fixed apex member and extending downwardly through said apex member; and a rotor driving member such as a crown-wheel or an epicyclic planetary cage is mounted on the lower end of the axle below the apex member; the arrangements disclosed and claimed herein constituting a further development of the rotor starter mechanisms of said Pecker patent and another co-pending application of Joseph S. Pecker, Serial No. 620,076, filed June 30, 1932.

The apex member may be directly attached to the usual exposed pylon struts or to the structural elements enclosed within or forming part of the body of the craft in the manner described in said co-pending patent application No. 617,500, and in the latter case the apex member and the whole of the rotor driving means and associated parts may be totally enclosed within the contour of the body, such an arrangement being advantageous in minimizing head resistance.

According to a feature of the present invention, as applied to aircraft on which rotor-braking means are incorporated, the rotor brake is arranged immediately below the crown wheel and the rotative part of the brake is arranged to be coupled either to the crown wheel or to the lower extremity of the rotative axle, as by means of a manually operable dog clutch, whereof the jaws may be provided with ratchet teeth to assist in obtaining quick disengagement.

A further feature of this invention provides a modified construction and arrangement of the mechanical rotor starting means more particularly applicable to an aircraft having its seating accommodation disposed rearwardly of the produced line of the rotor axis and wherein there is no necessity for the provision of an unobstructed space in the body immediately beneath the rotor centre.

Acccording to said modified construction the rotative axle of the rotor hub is prolonged downwardly into the body and carries the rotor driving member at its extreme lower end; and a drive shaft proceeding from the engine and carrying a driving pinion at its rear end is arranged substantially coaxial with or parallel to the engine crankshaft.

In order that the nature of the present invention may be more fully understood two forms of construction are described with reference to the accompanying drawings. In the description which follows, further features of the invention will appear.

In the drawings:—

Fig. 3 is a front elevation of the bottom cover of the rotor-head assembly;

Fig. 4 is a horizontal sectional view taken approximately on the line 44 of Fig. 2, part being broken away for clearness; and Fig. 5 is a transverse vertical section of the bottom cover shown in Fig. 3.

Figure 1:
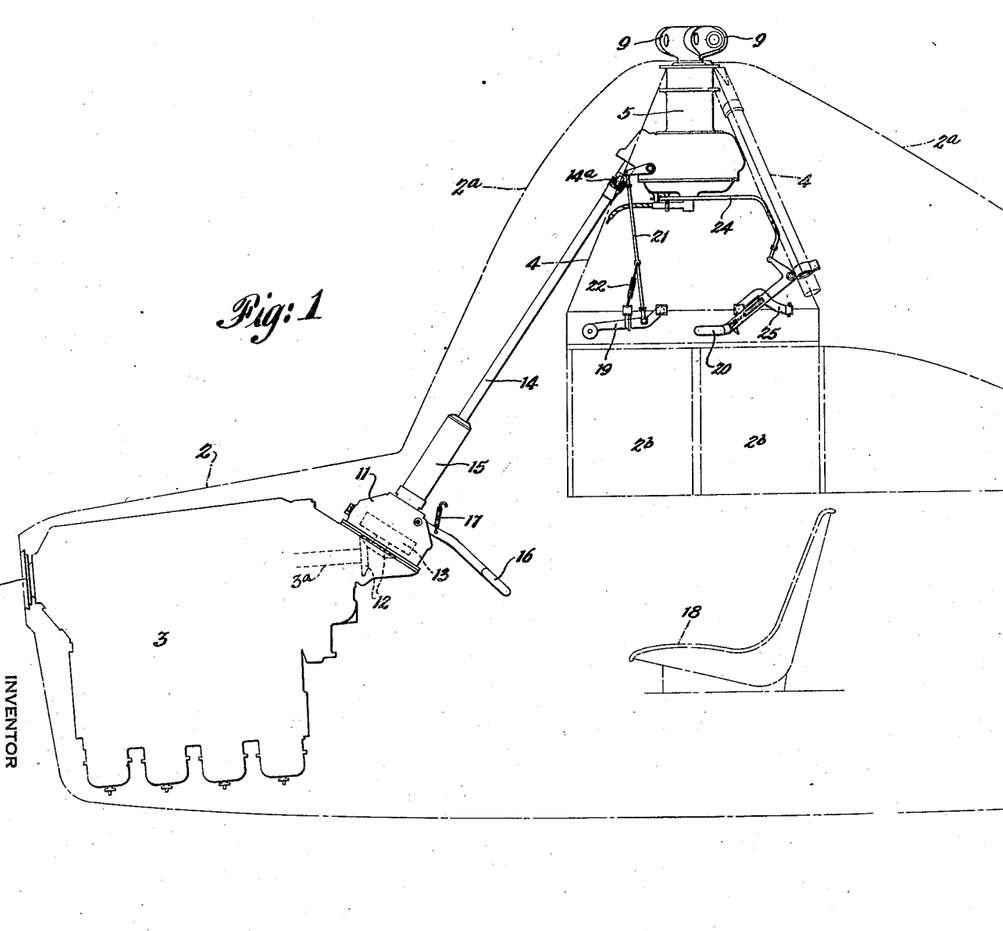
Fig. 1 shows diagrammatically, in fragmentary side view, the forward part of the body of an aircraft embodying one form of construction of the present invention, the rotary wings being omitted in this figure.
Figure 2:
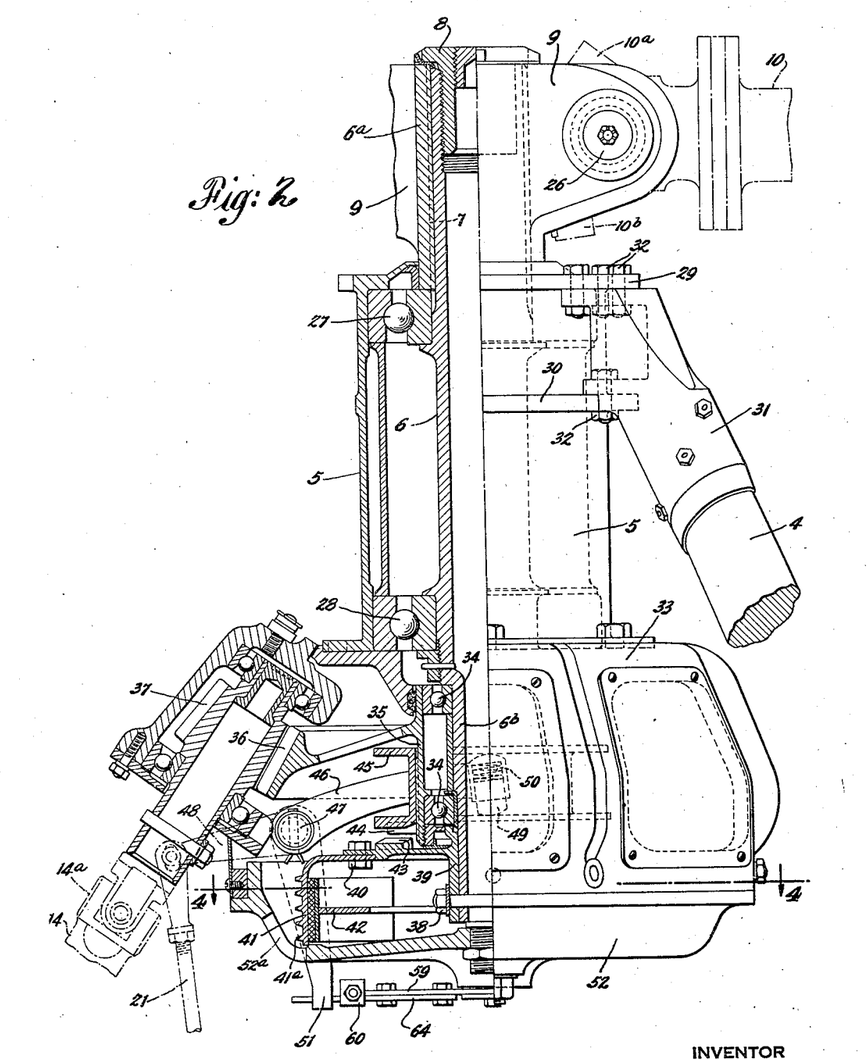
Fig. 2 shows in side view, partly in central vertical section, the rotor supporting apex member, rotor hub, and associated parts; and fragmentarily illustrating the mounting of one of the blades or wings of the rotor on the axis structure thereof.

Referring now chiefly to Fig. 1; the outline of the aircraft body is indicated in chain dotted lines 2, 2a; the latter part being an upward extension, or hump of the body, enclosing the rotor supporting structure and associated parts. In the front of the body is located an engine 3 driving a tractor airscrew (not shown) by means of a crank-shaft at 3a. The rotor is supported by means of a pylon or pyramid, composed, for example, of four struts 4 to which is attached an apex member 5 in which is journalled an axle 6 (see Fig. 2). On the upper part of the axle 6 is secured (as by splines 7 and a readily removable nut 8) an axis extension or rotor hub 6a formed with a plurality of lugs 9 arranged in pairs to form forks for the articulation of the rotor blades 10, the root end of one of which is illustrated in Fig. 2. To the rear end of the engine 3 is fixed a casing 11 containing bevel gearing 12 and a friction clutch 13 whereby the power of the engine is transmitted from the crankshaft 3a to an obliquely upwardly extending drive shaft 14, the lower end of which is enclosed within a casing 15 forming an extension of the casing 11.

The clutch within the casing 11 is controllable by means of a hand lever 16 which is biased to disengaged position by a spring 17. The lower end of the drive shaft 14 also comprises a universal joint enclosed within the casing 15, which joint, though not illustrated, may be similar to the upper universal joint 14a.

It will be noticed that the lever 16 is easily acccessible from a pilot's seat 18 from which also are accessible two levers 19, 20, arranged above the pilot's head. The lever 19 controls by means of a rod 21 a second clutch device incorporated in the upper part or unit of the rotor drive system as will be hereinafter described. The lever 19 and rod 21 are biased to disengaged position by means of a spring 22; while the lever 20 is formed as a bell crank and operates the rotor brake by means of a push and pull device 23, 24, (see also Fig. 3) the lever 20 being further provided with a ratchet quadrant device 25.

At this point it should be observed that the general arrangement of the body, the engine, the occupant's seat, the combined hump and cabin 2a, windows 2b, pylon, rotor hub, drive mechanism and controls is such as to provide good vision, ready access to the rotor controls without their encroaching on the available space, very good streamlining, and a rugged and compact rotor hub and pylon arrangement.

Referring now more particularly to Fig. 2; it will be seen that the rotative axis member 6 extends substantially vertically downward to the pylon apex or fixed supporting structure 5, and at the upper end is secured the said hub member 6a with its lugs 9, in the forks of which are mounted pins 26, on which the roots of the rotative blades 10 are hinged. Stop devices 10a, 10b, are provided, respectively to prevent excessive upward swinging of the blade, and to support the blade when at rest. The axle 9 is mounted by means of bearings 27, 28 in the apex member or box 5. The latter is provided with a pair of flanges 29 and 30, to which sockets 31 are attached by means of bolts 32, and into which sockets the upper ends of the pylon legs or struts 4 are secured. To the lower end of the apex member 5 is secured a casing 33 into which the lower end 6b of the axle 6 projects downwardly. On the axle part 6b is rotatably mounted by means of bearings 34 a sleeve 35, preferably integral with which is a bevel ring gear or crown wheel 36, which meshes with a pinion 37 driven through said universal joint 14a by the drive shaft 14. The universal joints 14a and the universal joint situated in the casing 15 (Fig. 1) provide for any defect in the alignment of the engine and the rotor axle and parts associated therewith and allow for a limited degree of movement which is unavoidable owing to a certain amount of flexibility present in the structure of an aircraft. To the lower extremity of the axle part 6b is fixed by bolts 38 a flanged sleeve 39, to the flange of which is attached by bolts 40 a brake drum 41 which is adapted to coact with brake shoes 42.

On the upper part of the flange of the member 39 are formed a series of dog clutch teeth 43 which engage with a corresponding set of teeth 44 formed on a collar 45 which is splined on the sleeve 35 so as to be slidable thereon without rotating. Engagement and disengagement of the dog clutch 43, 44 is effected by means of a lever 46 mounted on a cross shaft 47 and actuated by a lever 48 to which is attached the rod 21 already described.

The teeth 43, 44 of the dog clutch are formed of ratchet shape in such a way that should the rotor and therewith the axle 6 and member 39 tend to overrun the gearing 36, 37 the dog clutch will tend to disengage, and in order to enable such disengagement to take place the end of the lever 46 is provided with a device consisting of a plunger 49 working against a spring 50 which enables the collar 45 to rise and permit the disengagement of the teeth 43, 44 even when the dog clutch operating mechanism is in the engaged position.

The cross shaft 47 also carries a downwardly projecting arm 51, the function of which will hereinafter be described. The lower end of the casing 33 is closed by means of a cover plate 52 which carries the brake operating mechanism which is shown more clearly in Figs. 3, 4 and 5.

In the cover plate 52 is mounted a vertical pin 53 on which is hinged a pair of externally expanding brake shoes 42 which are provided with friction blocks 54 for coaction with the inner surface of the brake drum 41. The drum is preferably provided with flanges 41a (Fig. 2) for stiffening and for cooling purposes, and air circulation openings 52a may be provided in the cover 52 of casing 33. Diametrically opposite to the pin 53 is mounted in the bottom cover plate 52 a tubular member 55 which is made in two halves for ease of assembly. The upper part of the member 55 has formed thereon a pair of plates 56 in which are formed arcuate eccentric slots 57 embracing pins 58 which are mounted on the free ends of the brake shoes 42. The lower part of the member 45 has attached thereto a lever 59 the outer end of which is pinned into a fork 60 which is attached to a flexible push and pull member 23 working in a flexible abutment tube 24 and whose other end is attached to the lever 20 shown in Fig. 1.

The fork 60 is provided with an extension 61 which is guided in a slotted bracket 62 attached to the lower face of the cover plate 52. When the member 23 is moved to the right in Fig. 4 the tubular member 55 is rotated in an anti-clockwise direction by the lever 59 and the eccentric slots 57 act on the pins 58 to spread the brake shoes 42 apart and cause them to rub on the inner surface of the drum 41 thus applying the brake. Positive release of the brake is ensured by means of a tension spring 63 which connects the free ends of the brake shoes one with another.

The lever 59 has bolted thereto a plate 64 in which is formed an arcuate slot 65 and which also comprises a tongue 66. These parts coact with the downwardly projecting arm 51 to provide interlocking between the operation of the brake and the clutch in the following manner:—

In the position shown in Fig. 4 the dog clutch 43, 44 is disengaged and the brake is released. If the brake is now applied (by depressing lever 20, Fig. 1) the plate 64 moves to the right and the end of the arm 51 enters the curved slot 65. As long as the brake is applied the clutch operating mechanism is locked by the engagement of the arm 51 in the slot 65. On releasing the brake, however, the arm 51 is clear of the slot and the clutch may be operated. If the dog clutch 43, 44 is engaged, (by raising control lever 19, Fig. 1) the arm 51 moves so that it is opposite the tongue 66 of the plate 64. In this position the brake is locked by the engagement of the arm 51 and tongue 66 and cannot be applied.

A tension spring 64a may be used to bias the brake operating elements to released position.

It will be seen that in order to apply the power of the engine to drive the rotor either for starting purposes or to assist its rotation in flight it is necessary to engage the dog clutch 43, 44 by means of the hand lever 19 and to engage also the friction clutch 13 in the casing 11 (Fig. 1) by manipulating the lever 16. When the rotor has attained the required revolutions both clutches may be disengaged, but, should this action be inadvertently omitted, the rotor can, when autorotation begins, freely overrun the driving elements by the automatic disengagement of the dog clutch 43, 44. As a safeguard against overloading the engine or the drive mechanism the engagement pressure of the friction clutch in the casing 11 may be limited in such a way that this clutch will slip if a safe load is exceeded.

Referring now to the modifications of Figs. 6 to 9; the aircraft in this case is a single seater and comprises a body 2c having an upward extension 2d at the apex of which is mounted a rotor 10c. In the forward part of the body is mounted an engine 3c driving a tractor airscrew 3d. The pilot's seat 18a is arranged behind the centre line of the rotor and it will be seen that in this case the provision of an unobstructed space immediately beneath the rotor is not required.

Figure 6:
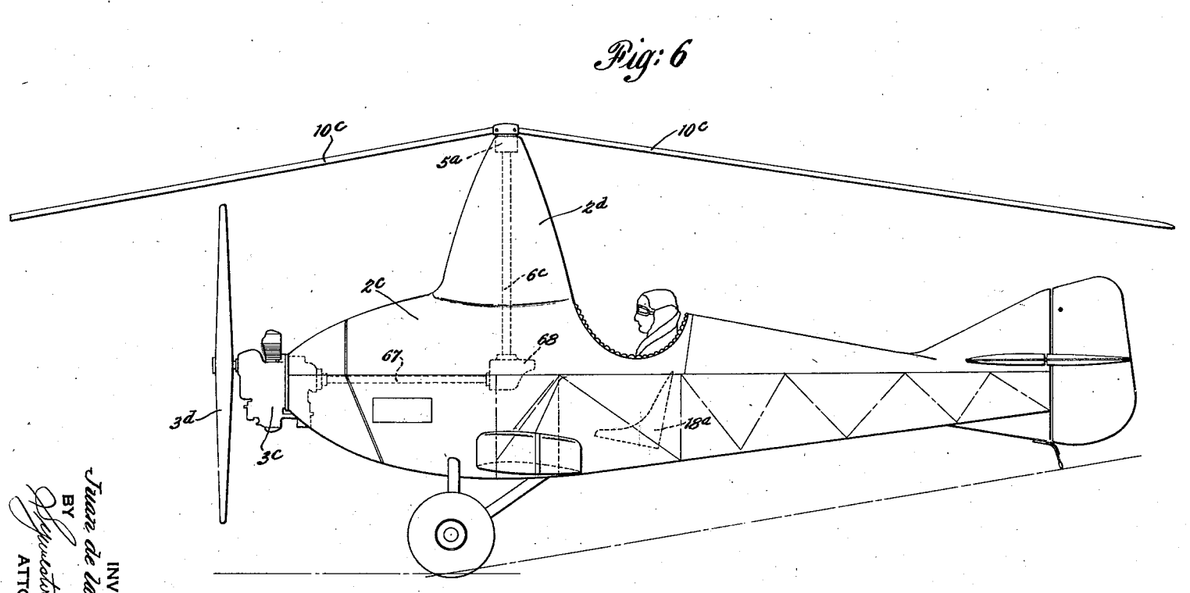
Fig. 6 is a diagrammatic view in side elevation of an aircraft incorporating an alternative form of construction of the rotor mounting, driving, and braking mechanism.

From the back end of the engine extends a drive shaft 67 coaxial with the engine crankshaft and the axle of the rotor 10c is provided with a downward extension 6c, the lower end of which and the rearward end of the shaft 67 are arranged to enter a central casing 68 containing a clutch, brake and reduction gear. The parts of the aircraft body need not here be particularized as they are obvious from the drawings.

Figure 7:
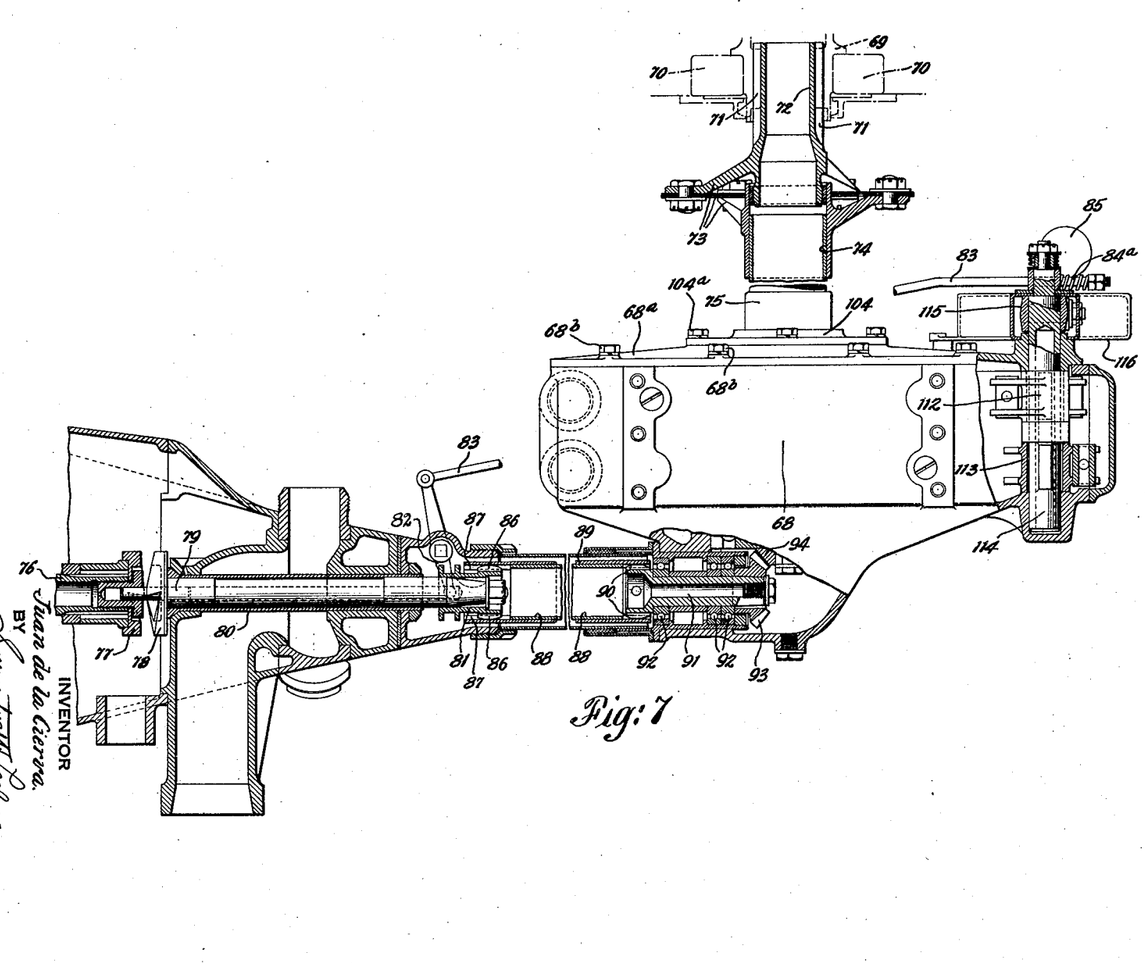
Fig. 7 shows this mechanism in side elevation, partly in section.
Figure 8:
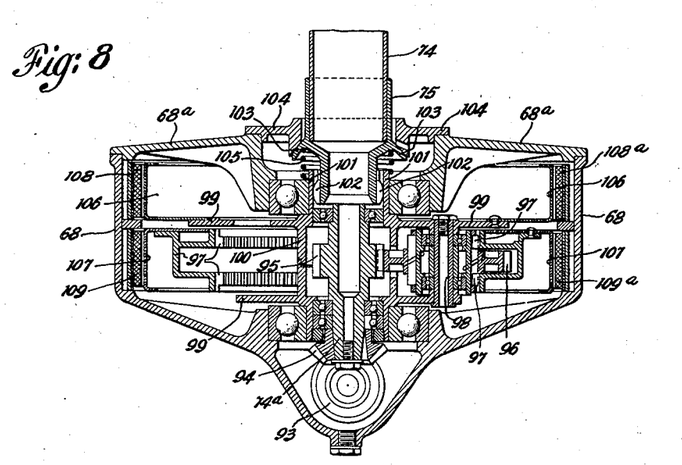
Fig. 8 shows the central unit of said mechanism in transverse vertical section.
Figure 9:
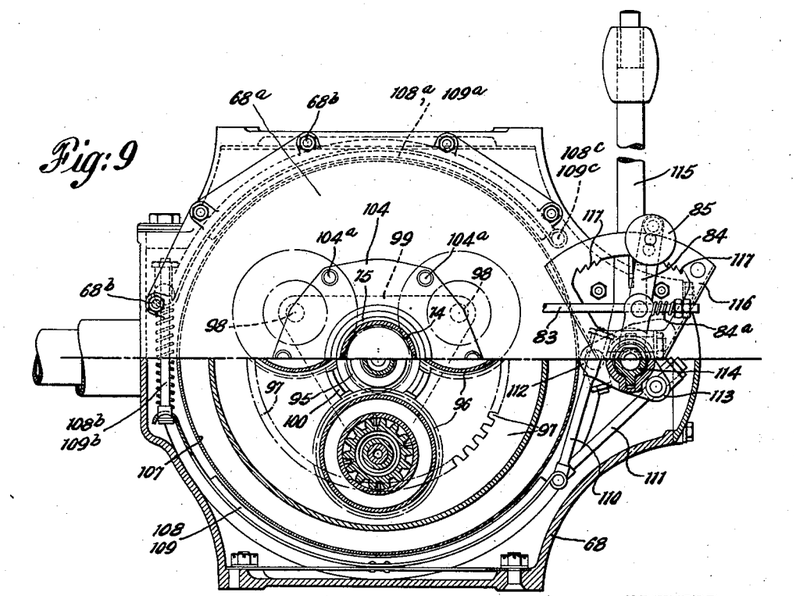
Fig. 9 shows the same in plan, partly in horizontal section.

Referring especially to Figs. 7, 8 and 9; a part of the axle of the rotor is indicated at 69. The upper end of this member carries lugs similar to those shown in the first form of construction (Fig. 2) on which the rotor blades are mounted. The axle 69 is rotatably mounted by means of a bearing 70 in a fixed, surrounding, apex member 5a, which is located at the upper extremity of the body extension 2d shown in Fig. 6. Although one bearing 70 only is shown a second bearing is arranged in the apex box, above the first, in order to support a rotor axle over a sufficient length.

The axle member 69 is provided with internal splines 71 which engage with corresponding splines of an extension 72 thus forming a joint capable of a limited degree of telescopic sliding. To the lower end of the extension 72 is fixed a universal joint 73, for example of the fabric disc type, the lower part of which is attached to the upper end of an axle extension shaft 74. The lower end of this shaft is fixed in a socket 75 which enters into the central casing 68. To the left of Fig. 7 is indicated at 76 the rear end of the engine crankshaft to which is fixed a dog clutch member 77 adapted to engage with a corresponding dog clutch member 78 mounted on the end of a short shaft 79 carried in a bearing 80 and having fixed to its rearward end a collar 81 which is engaged by a striking fork 82 operated by a rod 83 whose other end is connected with a hand lever 84 having a knob 85. When this knob is moved to the right in Fig. 9 the rod 83 is pulled and the striking fork slides shaft 79 to the left (in Fig. 7) thus engaging dog clutch 77, 78. The teeth of this clutch are of ratchet form so that if the rotor and the parts associated therewith tend to overrun the engine the clutch 77, 78 automatically disengages. In order that this disengagement may take place in spite of the lever 84 being held in the engaged position a spring connection 84a between the rod 83 and lever 84 is provided.

The collar 81 which is fixed to the rear end of the shaft 79 is provided with external splines 86 engaging with internal splines of a sleeve 87 to which is attached a tubular drive shaft 88 the rear end of which has attached thereto a sleeve 89, similar to 87 internally splined to engage with external splines 90 formed on the forward end of a short shaft 91. The splined parts 86, 90 are spherically machined so as to allow for a limited universal movement. The shaft 91 is carried in bearings 92 in the lower part of the casing 68 and has fixed to its rear end a bevel pinion 93 which meshes with a bevel pinion 94 mounted on a short vertical shaft 74a concentric with the shaft 74.

The speed reduction between shaft 88 and shaft 74 is by means of an epicyclic gearing of which the sun wheel 95 is integral with the short shaft 74a and the planet wheels and internally toothed outer ring are indicated at 96, 97, respectively. Each planet wheel 96 has a toothed portion of relatively large diameter, meshing with pinion 95; and a pair of toothed portions of relatively small diameter, meshing with the two rows of teeth of the internal ring 97. The planet wheels 96 are mounted on pins 98 which are carried between flanges 99 of a sleeve 100 forming the planetary cage. This sleeve has an upward extension 101 which is internally splined to engage with external splines 102 formed on the socket member 75. The splines 102 are also spherically machined to allow limited universal movement, and the socket 75 includes a spherical flange 103 which seats on a spherical seat of a cover plate 104 fixed to the upper part of the casing 68. Since the splined joints 101, 102 and 71, 72 allow shaft 74 to float in an up and down direction the weight of this shaft is supported by a spring 105 which bears on the underside of the flange 103 of the socket member 75.

To the upper flange 99 of the planetary cage 100 is riveted a drum 106 and below this is a similar drum 107 which is riveted to the outer ring gear 97 of the epicyclic train. These drums are respectively surrounded by friction bands 108, 109 each of which is made in two halves 108, 109 and 108a, 109a, respectively (see Fig. 9). These two halves are connected together by means of links 108b and 109b. The ends of the friction bands 108a and 109a are anchored to the casing 68 at 108c and 109c, while the ends of the other halves 108, 109 of the said bands have attached thereto links 110, 111 which are connected to toggles 112, 113, respectively, these toggles being keyed onto a vertical shaft 114 to the upper end of which is attached a lever 115 working in a quadrant 116 provided with ratchet teeth 117.

It will be noted that the links 110, 111 of the corresponding toggles 112, 113 are arranged on opposite sides of the shaft 114 so that movement of the lever 115 in one direction from its middle position tightens the brake band 108 while movement in the opposite direction tightens the clutch band 109, both bands being slack when the lever is in the mid position. Since the upper drum 106 is secured to the planetary cage 100 which is splined to the vertical shaft 74 forming the extension of the rotor axle the tightening of the band 108 on the drum 106 acts as a brake on the rotor.

The band 109, on the other hand, acts as a clutch since, if the drum 107 is free, the outer ring 97 of the epicyclic train is also free and rotation of the sun wheel 95 will transmit no movement to the planetary cage 100. When, however, the lever 115 is moved to tighten the band 109 on the drum 107 the outer ring 97 of the epicyclic gear is locked and rotation of the sun wheel 95 transmits rotation in the same direction to the planetary cage 100 at a reduced speed.

It will easily be seen from inspection of Fig. 9 that movement of the lever 115 to the right tightens the upper band 108 and so applies the brake, while movement to the left tightens the lower band 109 and engages the clutch.

The central housing 68 is not attached in any way to the engine or to the apex structure supporting the rotor. It is provided with independent supports of its own. For this reason, both ends of the shaft 88 and of the shaft 74 are provided with universal joints and a certain degree of telescopic movement since flexibility of the aircraft structure makes it necessary to allow for some relative movement between the engine and the housing 68 and between the latter and the rotor. At the same time the construction described allows for small inaccuracies of alignment in erection. The housing 68, besides having a central cover member 104 secured by bolts 104a, may also be assembled with a main top enclosure 68a secured by bolts 68b. The two main parts 68 and 68a carry the ball bearings 118 and 119 which support the planetary cage 100 and associated mechanism.

From the foregoing description of the structural features of the apparatus, there will be evident a number of advantages incident to this invention as compared with constructions heretofore employed, some of which advantages might be here pointed out, as follows:—

If the body and seating arrangement of Figure 1 be used, or that of Figure 6, the enclosed housing, and thus the streamlining, of all the major operating parts is assured; including a good part of the propulsive engine, most of the rotor head or hub structure, all of the rotor supporting structure, and all of the rotor driving and braking mechanism including the controls therefor.

Instead of extending up above the top or apex of the supporting pylon, the rotor brake and the rotor drive connection including the overrunning dog clutch, some of the bearings and associated parts, and most of the fixed and rotative axis structure, and the casing for all of said parts, are mounted in or below the pylon apex, whereby is secured not only the streamlining above referred to, but also a material reduction in overall height of the rotor mounting structure, and increase in strength for a given weight, a material lowering of the center of gravity of the rotor head (which is important since the rotor blades themselves must of necessity be placed relatively high to give ample clearances between said blades and the propeller and rudder, especially when the blades are in their drooped position as in Figure 6), more convenient removability of the rotor blades with the immediate part of the hub to which they are attached, and a more graceful appearance of the machine in general.

In the form of Fig. 1, most of the mechanism associated with the rotor is mounted within the confines or limits determined by the upper part of the rotor supporting structure, and yet said parts are very close to the plane of the rotor.

As to the housing of the parts associated with the rotor hub, access to the brake mechanism and other parts is readily had, by virtue of the fact that the housing is separable into upper and lower parts, or into three parts if the apex member 5 be also considered as a part of the housing.

In either the general arrangement of Figure 1 or the arrangement of Figure 6, adequate flexibility between the engine and the rotor hub is provided, as by universal joints in the drive shafting, and/or slip joints where necessary; and furthermore, in the structure of Figures 6 to 9, there is the added advantage of mounting the reduction gearing, the rotor brake and the manual rotor clutch mechanisms in a separate housing, which is independently supported, and may be separately opened or removed for inspection, adjustment and repair.

One of the operational advantages resides in the fact that in either form of construction, the rotor brake and rotor starter cannot simultaneously be applied: in the construction of Figures 1 to 5, this is accomplished in a novel manner by means of an interlock mechanism between the rotor brake and the overrunning clutch, mounted right in the rotor head casing itself, the brake and starter being operated by separate levers; while in the form of construction in Figures 6 to 9, it is accomplished by interlocking the main manual clutch with the rotor brake by means of a lever movable in two directions. In both forms of construction, it is to be noted that the overrunning clutch, as well as the manual torque-limiting clutch, must be positively operated, in order to effect rotor starter operation; and by this means it is possible to positively disconnect the entire rotor starter system both from the engine and from the rotor, whereby, in flight, the engine need not drag around the starter mechanism, nor will the rotor, when aerodynamically rotated, have to turn any considerable number of operating parts with it, and in fact, in the form shown in Figures 1 to 5, the rotor need not carry around any of the operating parts.

On the other hand, if either or both of the clutch mechanisms be inadvertently held in engagement, after take-off, the resilient mechanism (spring 50 in Fig. 2, or spring 84a in Fig. 9) will still permit the rotor, under its autorotational action, to overrun the driving mechanism, and by the use of dog clutches for such overrunning there will result a clicking sound which would normally remind the operator to disengage the clutches. It will further be observed from Figures 1 and 2 that when the several release spring devices are in proper operating condition, both clutches and the brake mechanism are urged or biased toward disengaged position.

By reference again to Figure 2, it will be seen that, within the compass of the relatively small housing of Figures 1 and 2, there is enclosed not only the parts hereinbefore mentioned, but also the rotor driving pinion, and bearings at each side of the pinion. Positive alignment of the rotor driving gears is thus assured at all times, regardless of any weaving or vibration of the rotor mounting pylon, and since there is no overhang of either of the gears beyond a bearing or bearings (as in certain prior constructions) whip and vibration are reduced to a minimum.

In the construction of Figures 6 to 9, it will be observed that the overrunning dog clutch is placed adjacent or in the engine, which makes it possible to incorporate substantially counterpart manual clutch means and braking means in association with the planetary reduction gearing. Furthermore, mounting of the rotor starter clutch in the engine makes possible a more compact clutch and engine arrangement, simplifies the manufacture and support of engine and clutch parts, and makes possible the lubrication of the dog-clutch from the lubrication system of the engine.

Various other advantages will occur to those skilled in this art.

I claim:—

1. In an aircraft having an engine for forward propulsion, a primary sustaining system comprising a rotative hub structure and rotative wing means flexibly mounted thereon in position to be normally aerodynamically actuated, mechanism for transmitting power from said engine to said rotor, an engageable and disengageable clutching device in the power mechanism constructed to provide for overrunning of the rotor even when connected, means for engaging said clutch device, a rotor brake mechanism, and means predeterminedly interrelating the operation of said device and said rotor brake mechanism whereby one of them cannot be engaged when the other is engaged.

2. In an aircraft, a sustaining rotor having a hub, a supporting structure for mounting the rotor above the body of the craft including structural elements converging upwardly toward the rotor hub, an apex device adjacent the top of said elements, spaced bearings for the rotor hub mounted in said device, and rotor driving mechanism including a clutch nested between said elements toward the top thereof below said spaced bearings.

3. In an aircraft with a forward propulsion engine and a normally wind-driven multi-bladed sustaining rotor of the type referred to, a rotor supporting structure including a fixed apex member, a central rotor hub member comprising a part to which the blades are attached and an axle solid therewith, said axle being rotatively mounted by means of external bearings in said fixed apex member and extending downwardly through the same, a driving connection between the engine and rotor for starting or assisting the rotation of the rotor, including a rotor driving means incorporating gearing mounted on the lower end of the axle below the apex member, and a rotor brake mounted below the driving means.

4. In an aircraft with a forward propulsion engine and a normally wind-driven multi-bladed sustaining rotor of the type referred to, a rotor supporting structure including a fixed apex member, a central rotor hub member comprising a part to which the blades are attached and an axle solid therewith, said axle being rotatively mounted by means of external bearings in said fixed apex member and extending downwardly through the same, a driving connection between the engine and rotor for starting or assisting the rotation of the rotor, including a rotor driving means incorporating gearing mounted on the lower end of the axle below the apex member, and a rotor brake mounted adjacent the driving means, with a disconnectible coupling means between the rotative part of the brake and the driving member.

5. In an aircraft having an engine for forward propulsion, a primary sustaining system comprising a rotative hub structure and rotative wing means flexibly mounted thereon in position to be normally areodynamically actuated, mechanism for transmitting power from said engine to said rotor, a connectible and disconnectible overrunning device in said mechanism including a pair of cooperating parts one of which is coupled with the rotor and has freedom for overrunning with respect to the other, whereby to permit the rotor to overrun the engine when the parts are connected, and means for connecting and disconnecting said parts.

6. In an aircraft having an engine for forward propulsion, a primary sustaining system comprising a rotative hub structure and rotative wing means flexibly mounted thereon in position to be normally areodynamically actuated, mechanism for transmitting power from said engine to said rotor, an engageable and disengageable clutching means in the line of power connections, a second engageable and disengageable clutching means in the line of power connections including a pair of cooperating parts one of which is coupled with the rotor and has freedom for overrunning with respect to the other, whereby to provide for overrunning of the rotor even when said parts are engaged, and means for engaging and disengaging said parts.

7. A cabin type aircraft having a forward propulsion engine, a normally aerodynamically actuated sustaining rotor, a place for the pilot in said cabin adjacent the rotor axis, driving means for starting said rotor from said engine including a drive connecting and disconnecting device adjacent the rotor hub above said place, rotor brake mechanism adjacent the rotor hub above said place, and manual controls for the rotor drive means and brake mechanism located in said cabin above the place for the pilot.

8. In an aircraft having an engine for forward propulsion, a primary sustaining system comprising a rotative hub structure, rotative wing means flexibly mounted thereon in position to be normally areodynamically actuated, rotor braking mechanism including a brake part fixed to rotate with the rotor hub, and a casing structure at least in large part housing the hub and said brake part, the casing being apertured adjacent said part and the said part having cooling flanges exposed to air circulation set up through the aperture in said casing during rotor movement.

9. In an aircraft, a sustaining rotor having a central hub extending downwardly, a supporting structure for mounting the rotor above the body of the craft including a housing adjacent the top of said structure within which said hub extends, a pair of vertically spaced-apart bearings in said housing rotatably mounting the hub, a rotor drive gear within the housing below said bearings, freely rotative bearing means between said gear and said hub, and an overrunning clutch connection between the gear and hub providing for free rotation of the rotor above the speed of the gear under the influence of autorotational actuation.

10. In an aircraft, a sustaining rotor having a central hub extending downwardly, a supporting structure for mounting the rotor above the body of the craft including a housing adjacent the top of said structure within which said hub extends, bearings in said housing rotatably mounting the hub, a rotor drive gear within the housing below said bearings, freely rotative bearing means between said gear and said hub, an overrunning clutch connection between the gear and hub providing for free rotation of the rotor above the speed of the gear under the influence of autorotational actuation, and additional means for manually disconnecting said overrunning clutch.

11. In an aircraft, a sustaining rotor having a central hub extending downwardly, a supporting structure for mounting the rotor above the body of the craft including a housing adjacent the top of said structure within which said hub extends, bearings in said housing rotatably mounting the hub, a rotor drive gear within the housing below said bearings in surrounding relation to the hub, said hub being extended downwardly below said gear, and braking mechanism associated with the said hub extension and being positioned within the housing below said gear.

12. In an aircraft, having a normally autorotative sustaining rotor and an engine driving a propeller, a driving connection for starting the rotor, extending upwardly from the engine to the rotor hub, a means of manual disconnection of the rotor driving system, and an overrunning means of disconnection of said system provided with a manual throw-out.

13. In an aircraft, having a normally autorotative sustaining rotor and an engine driving a propeller, a driving connection for starting the rotor, extending upwardly from the engine to the rotor hub, a means of manual disconnection of the rotor driving system, and an overrunning means of disconnection of said system provided with a manual throw-out, one of said means being located adjacent the engine and the other of said means adjacent the rotor hub.

JUAN DE LA CIERVA.

CERTIFICATE OF CORRECTION.

Patent No. 2,037,766. April 21, 1936.

JUAN de la CIERVA.

It is hereby certified that error appears in the printed specification of the above numbered patent requiring correction as follows: Page 5, second column, line 2, claim 1, after "engaging" insert the words and disengaging; and that the said Letters Patent should be read with this correction therein that the same may conform to the record of the case in the Patent Office.

Signed and sealed this 23rd day of June, A. D. 1936.

(Seal)

Leslie Frazer
Acting Commissioner of Patents.